J. A. HOWARD, Sr.
COOKING UTENSIL.
APPLICATION FILED JAN. 30, 1919.

1,344,511

Patented June 22, 1920.

WITNESS: Samuel T. Shaw, Jr.

INVENTOR. J. A. Howard Sr.

UNITED STATES PATENT OFFICE.

JOHN A. HOWARD, SR., OF WEST NEW BRIGHTON, NEW YORK.

COOKING UTENSIL.

1,344,511.  Specification of Letters Patent.  Patented June 22, 1920.

Application filed January 30, 1919. Serial No. 274,047.

*To all whom it may concern:*

Be it known that I, JOHN A. HOWARD, Sr., a citizen of the United States, and residing at #34 Mountain View avenue, West New Brighton, Staten Island, New York, have invented a new and useful Improvement in Cooking Utensils, of which the following is a specification.

The bottom of a cooking utensil of which the ordinary tea or coffee pot is taken for an example should have the middle of its bottom inverted internally, giving the contents a greater heating surface and in addition, a retarder placed over it on the inside of the utensil, which will prevent the first bubbles of steam from emerging into the cool, air space above water line.

By retarding the circulation at the beginning of boiling operations, quicker results are obtained and as water commences to boil, the interior cone will rise up to lid of pot, giving a warning that the boiling point has arrived, avoiding the spilling over and loss of water through spout or lid of vessel.

The principal idea is to keep the heated vapor from escaping at once up to the cool air space between water line and lid, which is the real loss and waste at the beginning before boiling commences. The interior cone may also be used in any flat bottom utensil, which, to a considerable extent will result in economy.

In describing my invention in detail, reference will be had to the accompanying drawings wherein like characters denote like or corresponding parts throughout the several views, and in which:—

Figure 1:
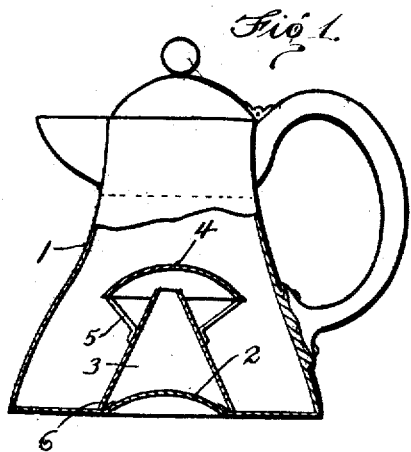
Figure 1 is a view partly in section showing my invention in use on a coffee pot provided with a projecting part on its bottom.
Figure 4:
Fig. 4 is a plan view of the attachment.
Figure 2:
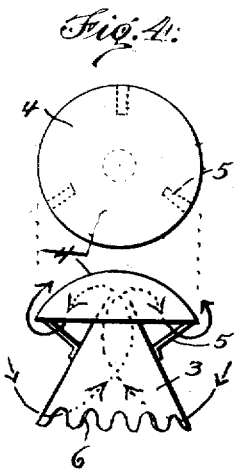
Fig. 2 is a view of the attachment alone.

Referring to Fig. 1, 1 indicates the coffee pot which is provided with a semi-circular projection 2 on its bottom whereby the heating surface is increased. 3 indicates a conical member placed over said projection and carrying the inverted bowl-shaped member 4. This member 4 is supported in spaced relation above the open end of the conical member by the inclined supports 5. The lower edge of the member 3 is corrugated as at 6 to permit the circulation of the water, as shown by the arrows in Fig. 2. The other arrows in this figure show how the water passes upwardly through the member 3 and is deflected downwardly by the member 4.

Figure 3:
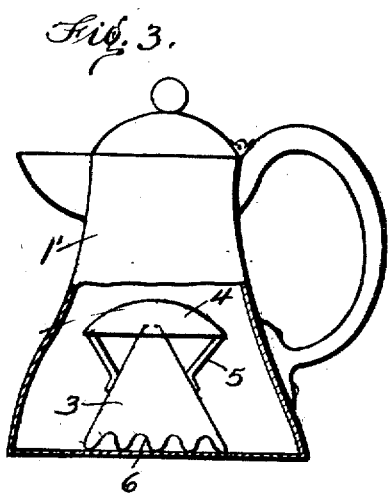
Fig. 3 is a view partly in section showing the invention applied to an ordinary coffee pot.

Fig. 3 shows the device placed in a coffee pot 1' which is provided with a flat bottom, said coffee pot being of the ordinary construction.

It will be seen that the member 4 momentarily retards the water before it escapes to the upper water level. Thus the water is heated to a greater degree before escaping than it would be if this retarding action did not take place.

When the device is placed in the coffee pot its weight will cause it to sink to the bottom thereof as shown in Figs. 1 and 3 but as soon as sufficient steam is generated the device will rise to the surface thus giving warning that the water is boiling.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

In combination with a cooking utensil, a hollow upwardly tapered member therein having both ends open and an inverted dome-shaped plate located above the upper end of said member and connected with said member for catching steam passing from said member, said device having specific gravity greater than that of water whereby it will remain submerged until steam is generated and caught thereby whereupon it will rise to the surface of the water.

JOHN A. HOWARD, SR.